(12) United States Patent
Yagisawa et al.

(10) Patent No.: US 9,054,812 B2
(45) Date of Patent: Jun. 9, 2015

(54) OPTICAL MODULE

(71) Applicant: FUJITSU LIMITED, Kawasaki-shi, Kanagawa (JP)

(72) Inventors: Takatoshi Yagisawa, Kawasaki (JP); Takashi Shiraishi, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/192,294

(22) Filed: Feb. 27, 2014

(65) Prior Publication Data

US 2014/0193160 A1 Jul. 10, 2014

Related U.S. Application Data

(63) Continuation of application No. PCT/JP2011/072486, filed on Sep. 29, 2011.

(51) Int. Cl.
| | |
|---|---|
| *G02B 6/42* | (2006.01) |
| *H04B 10/40* | (2013.01) |
| *H04B 10/25* | (2013.01) |

(52) U.S. Cl.
CPC .............. *H04B 10/40* (2013.01); *G02B 6/4246* (2013.01); *G02B 6/4269* (2013.01); *G02B 6/4284* (2013.01); *H04B 10/2503* (2013.01)

(58) Field of Classification Search
CPC .. G02B 6/4246; G02B 6/4269; G02B 6/4284; H04B 10/2503; H04B 10/40
See application file for complete search history.

(56) References Cited

U.S. PATENT DOCUMENTS

| | | | |
|---|---|---|---|
| 6,179,627 B1 * | 1/2001 | Daly et al. .................... | 439/76.1 |
| 6,661,939 B2 | 12/2003 | Kaneko et al. | |
| 7,090,509 B1 * | 8/2006 | Gilliland et al. ............. | 439/76.1 |
| RE40,154 E * | 3/2008 | Ishibashi et al. ................ | 385/92 |
| 7,396,166 B1 * | 7/2008 | Chou .............................. | 385/92 |

(Continued)

FOREIGN PATENT DOCUMENTS

| | | |
|---|---|---|
| JP | 2004-258065 A | 9/2004 |
| JP | 2006-113566 A | 9/2004 |
| JP | 2007-240833 A | 9/2007 |
| JP | 2008-139492 A | 6/2008 |

OTHER PUBLICATIONS

Cost-effective On-board Optical Interconnection using Waveguide Sheet with Flexible Printed Circuit Optical Engine, Takashi Shiraishi, et. al., OFC/NFOEC 2011, OtuQ5.

(Continued)

*Primary Examiner* — Akm Enayet Ullah
(74) *Attorney, Agent, or Firm* — Fujitsu Patent Center (57) ABSTRACT

An optical module includes: a first circuit board on which a connector socket is mounted, an optical transceiver module that is electrically connected to the first circuit board via the connector socket; a heat sink; and a heat dissipating sheet. The optical transceiver module includes: a second circuit board on which an E/O converter, a drive circuit for the E/O converter, an O/E converter, and a current-to-voltage conversion circuit for the O/E converter are mounted; and an optical waveguide that guides an optical signal generated by the E/O converter to an output end of the optical transceiver module, and that guides an input optical signal to the O/E converter. The heat sink is thermally coupled to the E/O converter, the drive circuit, the O/E converter, and the current-to-voltage conversion circuit via the heat dissipating sheet, and presses the optical transceiver module onto the first circuit board.

10 Claims, 9 Drawing Sheets

(56) References Cited

U.S. PATENT DOCUMENTS

| | | | |
|---|---|---|---|
| 7,529,488 B2* | 5/2009 | Burdick et al. | 398/137 |
| 7,543,998 B2* | 6/2009 | Takizawa et al. | 385/92 |
| 8,047,856 B2* | 11/2011 | McColloch | 439/71 |
| 8,195,017 B2* | 6/2012 | Kaneshiro et al. | 385/49 |
| 8,744,268 B2* | 6/2014 | Lou et al. | 398/138 |
| 8,842,952 B2* | 9/2014 | Tanaka et al. | 385/52 |
| 8,908,726 B2* | 12/2014 | Firth et al. | 372/34 |
| 8,911,158 B2* | 12/2014 | McColloch et al. | 385/89 |
| 8,958,697 B2* | 2/2015 | Soto et al. | 398/100 |
| 2006/0062512 A1 | 3/2006 | Lee et al. | |

OTHER PUBLICATIONS

International Search Report, mailed in connection with PCT/JP2011/072486 and mailed Nov. 8, 2011.

Notification of Transmittal of Translation of the International Preliminary Report on Patentability (Form PCT/IB/338, Form PCT/IB1373 & Form PCT/ISA/237), PCT/JP2011/072486, 5 pages, dated Apr. 10, 2014.

* cited by examiner

OPTICAL MODULE

CROSS-REFERENCE TO RELATED APPLICATION

This application is a continuation application of International Application PCT/JP2011/072486 filed on Sep. 29, 2011 and designated the U.S., the entire contents of which are incorporated herein by reference.

FIELD

The embodiments discussed herein are related to an optical module for transmitting and receiving an optical signal.

BACKGROUND

In recent years, a system for processing information using a plurality of processors which operate in parallel has been popular. For example, a blade server is an information processing system which includes a plurality of blades. Each of the blades includes a CPU and a memory, and operates as a computer. The plurality of blades are accommodated in a chassis in the specified shape.

Each of the blades can transmit and receive data to/from other blades. Namely, the blades are connected through a transmission link. According to one embodiment, the blades are connected through a metal cable transmitting an electrical signal, such as a coaxial cable. In this case, a signal conforming to, e.g., a PCI (Peripheral Components Interconnect) is transmitted between the blades.

However, further increases in speed of information processing have been requested, and further increases in speed of a signal transmitted between blades have also been needed. For example, the transmission between blades of a high-speed signal with a speed exceeding 10 Gb/s is sometimes requested. For that reason, a configuration in which blades are connected through an optical interface, instead of the electric interface as described above, has been developed.

When an optical interconnection in which blades are connected through an optical interface is realized, each of the blades includes an optical module for transmitting and receiving an optical signal. The optical module includes an optical transmitting module and an optical receiving module. The optical transmitting module includes one or more electrical-to-optical converters (E/O converter) and corresponding drive circuits that respectively drive the E/O converters. The optical receiving module includes one or more optical-to-electrical converters (O/E converter) and corresponding amplifiers that respectively amplify outputs of the O/E converters. Therefore, when the density of the optical module increases, the power consumption of the optical module increases and an efficient heat radiation structure is needed.

As a related art, an optical waveguide board described below has been proposed. This optical waveguide board includes a base material, a film, an optical element, and an optical path switch. The film, in which an optical waveguide is formed that includes a core that is an optical path propagating an optical signal and a clad surrounding the core, is provided on a principal surface of the base material. The optical element is implemented on at least either of the base material and the film, and is optically coupled to the optical waveguide. The optical path switch changes the optical path propagating an optical signal in a desired direction. (For example, Japanese Laid-open Patent Publication No. 2004-258065)

As another related art, an optical module which includes an optical element which is flip-chip implemented on a board, an optical waveguide which is formed on the board and optically coupled to the optical element, and an underfill resin which is filled in between the board and the optical element and covers an optical connecting point between the optical element and the optical waveguide, has been proposed. (For example, U.S. Pat. No. 6,661,939)

As still another related art, an optical module which includes a flexible printed circuit on which optical elements (E/O and O/E) are flip-chip mounted, and an optical waveguide which is provided on the flexible printed circuit, has been proposed. A 45-degree mirror is formed in the optical waveguide so as to be optically coupled to a light emitting surface of the E/O and a photo detector surface of the O/E. (For example, Cost-effective On-board Optical Interconnection using Waveguide Sheet with Flexible Printed Circuit Optical Engine, Takashi Shiraishi, et al., OFC/NFOEC 2011, OTuQ5)

When the optical modules described in the related art document Shirasaki, etc., are mounted on a board (e.g., blade), an optical module may be attached to a blade so that a board of the optical module is disposed in parallel to the blade. In this case, an area occupied by the optical module is large in the blade.

In order to reduce the area for mounting the optical module, an optical module board on which a plurality of optical modules are mounted may be vertically attached to a mother board of the blade. However, in such a configuration, it is not easy to mount the plurality of optical modules on the optical module board with spatial efficiency and to efficiently dissipate heat generated in the optical modules.

SUMMARY

According to an aspect of the embodiments, an optical module includes: a first circuit board on which a connector socket is mounted; an optical transceiver module that is electrically connected to the first circuit board via the connector socket; a heat sink; and a heat dissipating sheet. The optical transceiver module includes: a second circuit board on which an electrical-to-optical converter, a drive circuit that drives the electrical-to-optical converter, an optical-to-electrical converter, and a current-to-voltage conversion circuit that converts an output current of the optical-to-electrical converter into a voltage signal are face-down mounted; and an optical waveguide that guides an optical signal generated by the electrical-to-optical converter to an output end of the optical transceiver module, and that guides an optical signal input to the optical transceiver module to the optical-to-electrical converter. The heat sink is thermally coupled to the electrical-to-optical converter, the drive circuit, the optical-to-electrical converter, or the current-to-voltage conversion circuit, or any combination thereof via the heat dissipating sheet, and the heat sink presses the optical transceiver module onto the first circuit board.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An optical module according to an embodiment will be described below with reference to the drawings. In the following, the optical module according to the embodiment is used, but is not particularly limited to be used, in a blade server. Namely, the optical module according to the embodiment is mounted on a blade of a blade server in the example below.

Figure 1A:
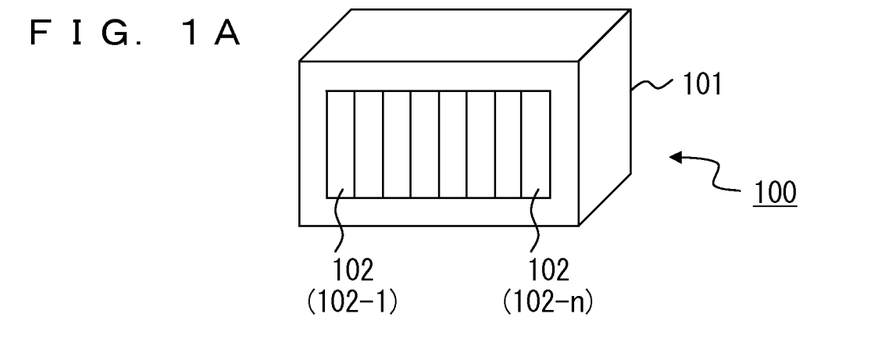
FIGS. 1A, 1B, and 1C illustrate a blade server using an optical module according to an embodiment.
Figure 1B:
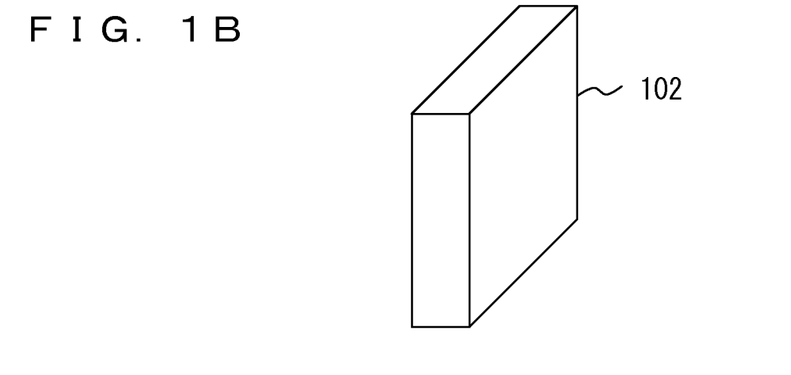
Figure 1C:
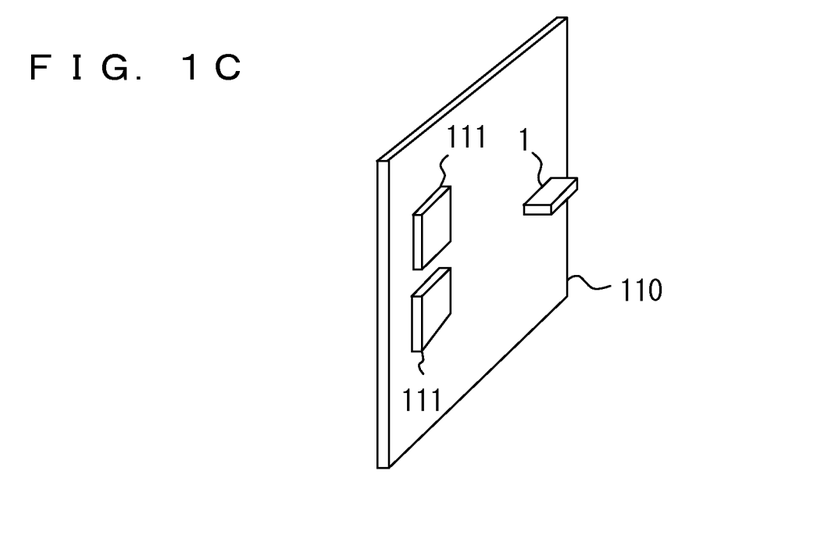

FIG. 1 illustrates a blade server 100 that uses the optical module according to the embodiment. As illustrated in FIG. 1A, the blade server 100 includes a chassis 101 and a plurality of blades 102 (102-1 to 102-n). Each of the blades 102 has, for example, an approximately rectangular parallelepiped shape, as illustrated in FIG. 1B. Note that the blade 102 illustrated in FIG. 1B corresponds to one of the plurality of blades inserted into the chassis 101 of the blade server 100 illustrated in FIG. 1A.

The blade server 100 includes optical links for transmitting optical signals between the blades 102. The optical link is realized by, for example, an optical waveguide and an optical fiber. On the optical link, an optical switch and/or an optical cross connect may be provided. Each of the blades 102 can transmit and receive data to/from one or more other blades 102 using the optical links.

Each of the blades 102 includes a blade main board 110 as illustrated in FIG. 1C. On the blade main board 110, one or more CPUs 111 are mounted. A memory IC is also mounted on the blade main board 110, which is not particularly illustrated. The memory may be provided in the CPU 111. Each of the blades 102 can operate as a computer.

Each of the blades 102 includes an optical module. The optical module 1 is attached to the blade main board 110 as illustrated in FIG. 1C. In this example, on the blade main board 110, a vertical connection type edge connector socket not illustrated is implemented. The optical module 1 is attached to the blade main board 110 using the vertical connection type edge connector socket. Therefore, the optical module 1 is attached to the blade main board 110 so as to project in the direction vertical to one surface of the blade main board 110.

The optical module 1 includes an optical transmitter and an optical receiver. An electric circuit of the optical transmitter and the optical receiver is electrically connected to a circuit formed in the blade main board 110. The optical module 1 can convert an electrical signal generated in the blade main board 110 into an optical signal and transmit the optical signal to another blade. Further, the optical module 1 can convert an optical signal received from another blade into an electrical signal and guide the electrical signal to the blade main board 110.

In the example illustrated in FIG. 1, the blade server 100 is realized by the plurality of blades 102 accommodated in a chassis 101. In this case, an optical module 1 provided in a blade transmits and receives an optical signal to/from another blade accommodated in the chassis 101. However, the blade server 100 may be realized by a plurality of blades accommodated in a plurality of chassis. In this case, an optical module 1 provided in a blade may transmit and receive an optical signal to/from another blade accommodated in the same chassis, and may transmit and receive an optical signal to/from a blade accommodated in another chassis. In addition, an optical module 1 provided in a blade may transmit and receive an optical signal to/from another optical module in the same blade.

Figure 2:
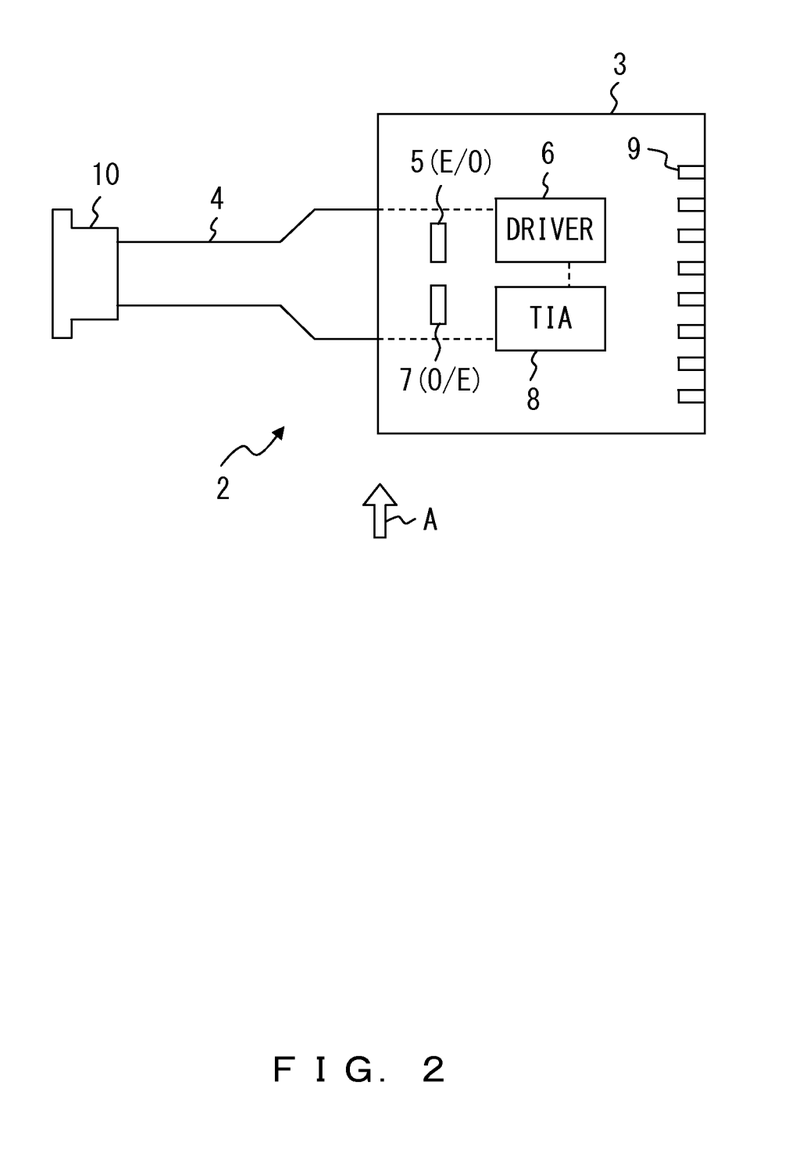
FIG. 2 is a plan view of an optical transceiver module included in an optical module.

FIG. 2 is a plane view of an optical transceiver module included in the optical module 1. The optical transceiver module 2 includes a flexible printed circuit 3 and an optical waveguide 4.

The Flexible Printed Circuit (FPC) 3 is a flexible thin printed board. The thickness of the flexible printed circuit 3 is, but is not particularly limited to, for example, 20 to 50 μm. A material of the flexible printed circuit 3 is, but is not particularly limited to, for example, polyimide resin. On the flexible printed circuit 3, an electrical-to-optical (E/O) converter 5, a driver IC 6, an optical-to-electrical (O/E) converter 7, and a transimpedance amplifier (TIA) 8 are face-down mounted with, for example, a flip chip. In the face-down mount, a face of a device (e.g., a light emitting surface of the E/O converter, a photo detector surface of the O/E converter, and a surface in which an IC pad of a circuit element is formed) are mounted so as to face downward (i.e., to the side of a board).

The E/O Converter 5 is driven by the driver IC 6 and generates an optical signal corresponding to a data signal. Namely, the E/O converter 5 converts an input electrical signal into an optical signal. The E/O converter 5 is realized by, for example, a laser diode. The laser diode is, but is not particularly limited to, for example, a Vertical-Cavity Surface-Emitting Laser (VCSEL). The E/O converter 5 may be configured to convert a plurality of electrical signals into respective optical signals. In this case, the E/O converter 5 includes a plurality of laser diodes.

The driver IC 6 is a drive circuit which drives the E/O converter 5 in accordance with a data signal. Namely, the driver IC 6 drives the E/O converter 5 with the current corresponding to the data signal. As a result, the E/O converter 5 generates an optical signal corresponding to the data signal. The data signal is generated in the blade main board 110 illustrated in FIG. 1C, and is guided to the drive IC 6 via a corresponding terminal of an edge connector 9 and a circuit formed in the flexible printed circuit 3.

The O/E Converter 7 converts an optical signal received via the optical waveguide 4 into an electrical signal. This electrical signal is a current signal that represents the received optical signal. The electrical signal generated by the O/E converter 7 is guided to the TIA 8. The O/E converter 7 is realized by, for example, a photo diode. The O/E converter 7 may be configured to convert a plurality of optical signals into respective electrical signals. In this case, the O/E converter 7 includes a plurality of photo diodes.

The TIA 8 converts a current signal generated by the O/E converter 7 into a voltage signal. Namely, the TIA 8 operates as a current-to-voltage conversion circuit. At this time, the TIA 8 may output a differential voltage signal. The output signal of the TIA 8 is guided to the blade main board 110 illustrated in FIG. 1C via a circuit formed in the flexible printed circuit 3 and a corresponding terminal of the edge connector 9. The optical transceiver module 2 may use another current-to-voltage conversion circuit instead of the TIA 8.

The edge connector 9 is formed in an edge area on one side of the flexible printed circuit 3. The terminals of this edge connector 9 are electrically connected to respective terminals of a connector socket, which is implemented on an optical module circuit board, as will described later. The driver IC 6 and a corresponding terminal of the edge connector 9 are electrically connected via a circuit formed in the flexible printed circuit 3. The TIA 8 and a corresponding terminal of the edge connector 9 are also electrically connected via the circuit formed in the flexible printed circuit 3.

In this example, the optical waveguide 4 is realized by a film in which a core propagating light and a clad surrounding the core are formed. The thickness of the core is, but is not particularly limited to, for example, 40 to 60 μm. In addition, this film is realized by, but is not particularly limited to, for example, a polymer material. The optical waveguide 4 includes one or more transmitting optical waveguide channels and one or more receiving optical waveguide channels. The transmitting optical waveguide channel guides an optical signal generated by the E/O converter 5 to an output end of the optical transceiver module 2. In addition, the receiving optical waveguide channel guides an optical signal input to the optical transceiver module 2 to the O/E converter 7.

An optical connector 10 is optically coupled to an end of the optical waveguide 4. The optical connector 10 is, for example, a PMT connector. The PMT connector is a multi-core optical connector for a polymer optical waveguide. Namely, a plurality of optical fibers can be coupled to the optical connector 10.

Figure 3:
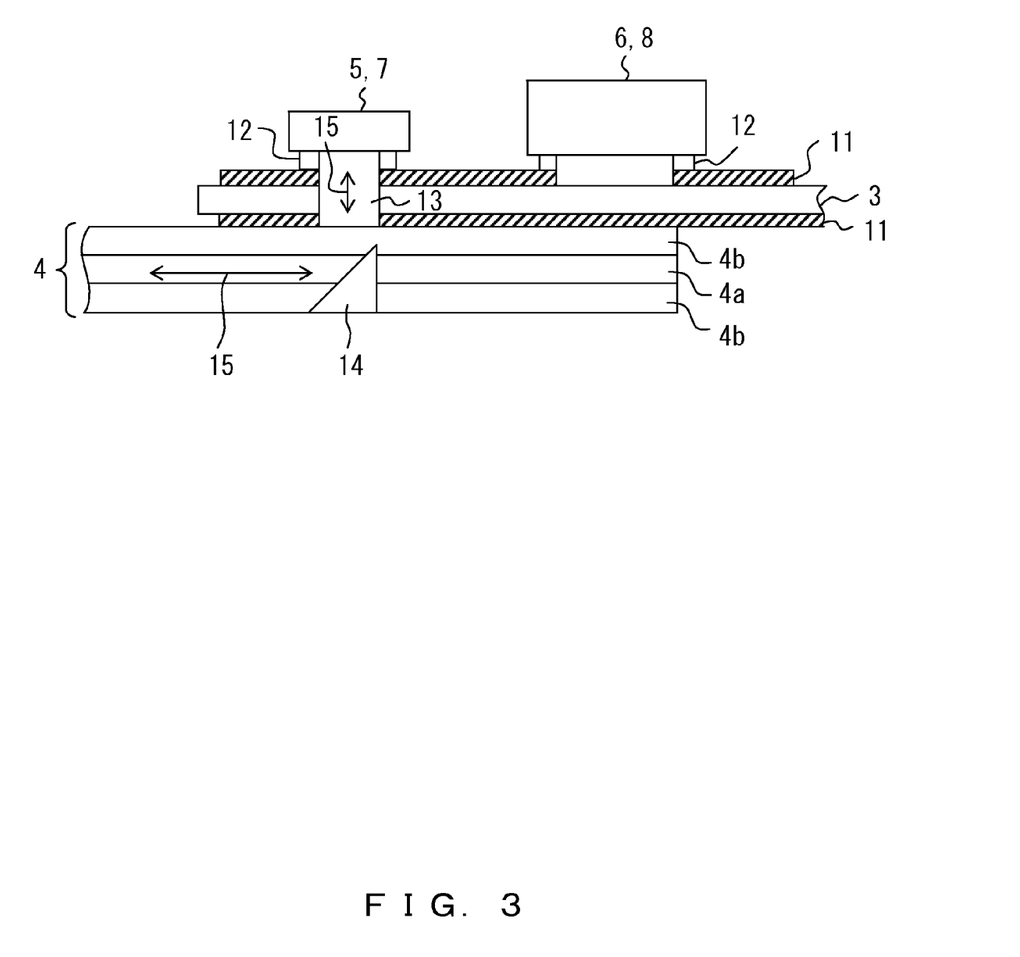
FIG. 3 is a side view of the optical transceiver module illustrated in FIG. 2.

FIG. 3 is a side view of the optical transceiver module 2 illustrated in FIG. 2. Here, FIG. 3 illustrates the optical transceiver module 2 obtained from a visual line direction represented by the arrow A in FIG. 2. Note that FIG. 3 illustrates a portion of the optical transceiver module 2. In addition, FIG. 3 schematically illustrates the flexible printed circuit 3 and the optical waveguide 4 in order to explain a structure of the optical transceiver module 2.

On an upper surface and a lower surface of the flexible printed circuit 3, a conductor 11 is selectively formed. Here, the upper surface indicates a surface on which the E/O converter 5, the O/E converter 7, etc., are mounted, of two surfaces of the flexible printed circuit 3. The lower surface indicates the other surface of the two surfaces of the flexible printed circuit 3.

The conductor 11 forms a circuit. This circuit includes a circuit between the E/O converter 5 and the driver IC 6, a circuit between the O/E converter 7 and the TIA 8, a circuit between the driver IC 6 and the edge connector 9, a circuit between the TIA 8 and the edge connector 9, and a ground pattern. Further, this circuit includes a data signal line propagating a data signal, a control signal line propagating a control signal, and a power supply line for supplying power to the E/O converter 5, the driver IC 6, the O/E converter 7, and the TIA 8.

On the upper surface of the flexible printed circuit 3, the E/O converter 5, the driver IC 6, the O/E converter 7, and the TIA 8 are mounted. In this example, the E/O converter 5, the driver IC 6, the O/E converter 7, and the TIA 8 are face-down connected (or, face-down mounted) to the conductor 11 on the upper surface of the flexible printed circuit 3. As an example, the E/O converter 5, the driver IC 6, the O/E converter 7, and the TIA 8 are flip-chip mounted on the upper surface of the flexible printed circuit 3. In this case, the E/O converter 5, the driver IC 6, the O/E converter 7, and the TIA 8 are electrically connected to the conductor 11 using bump 12.

The light emitting surface of the E/O converter 5 and the photo detector surface of the O/E converter 7 are faced to the flexible printed circuit 3. The flexible printed circuit 3 has a through hole 13 in a region in which the E/O converter 5 and the O/E converter 7 are mounted. When the flexible printed circuit 3 is transparent to an optical wavelength of an optical signal, the through hole 13 does not need to be formed in the flexible printed circuit 3.

The optical waveguide 4 includes a core 4a propagating light and a clad 4b surrounding the core 4a. The refractive indexes of the core 4a and the clad 4b are different from each other. The optical waveguide 4 is coupled to the lower surface of the flexible printed circuit 3. In this example, the optical waveguide 4 is stuck to the lower surface of the flexible printed circuit 3 with an adhesive.

A lens may be provided between the flexible printed circuit 3 and the optical waveguide 4 in order to improve the optical coupling efficiency between the optical waveguide 4 and optical devices (the E/O converter 5 and the O/E converter 7). In this case, a sheet-like lens with a thickness of about 100 μm may be used.

The optical waveguide 4 includes a mirror 14 reflecting an optical signal. The mirror 14 is formed so as to have an angle of 45 degrees to the propagation direction of light in the optical waveguide 4. Further, the mirror 14 is disposed so as to be positioned just below the E/O converter 5 and the O/E converter 7. Namely, the optical waveguide 4 is coupled to the lower surface of the flexible printed circuit 3 so that the mirror 14 is positioned just below the E/O converter 5 and the O/E converter 7.

An arrow 15 illustrated in FIG. 3 indicates an optical signal. Namely, an optical signal generated by the E/O converter 5 is reflected by the mirror 14, and is propagated to the optical connector 10 via the core 4a. In addition, an input optical signal is propagated via the core 4a, and is guided to the O/E converter 7 by the mirror 14.

Figure 4:
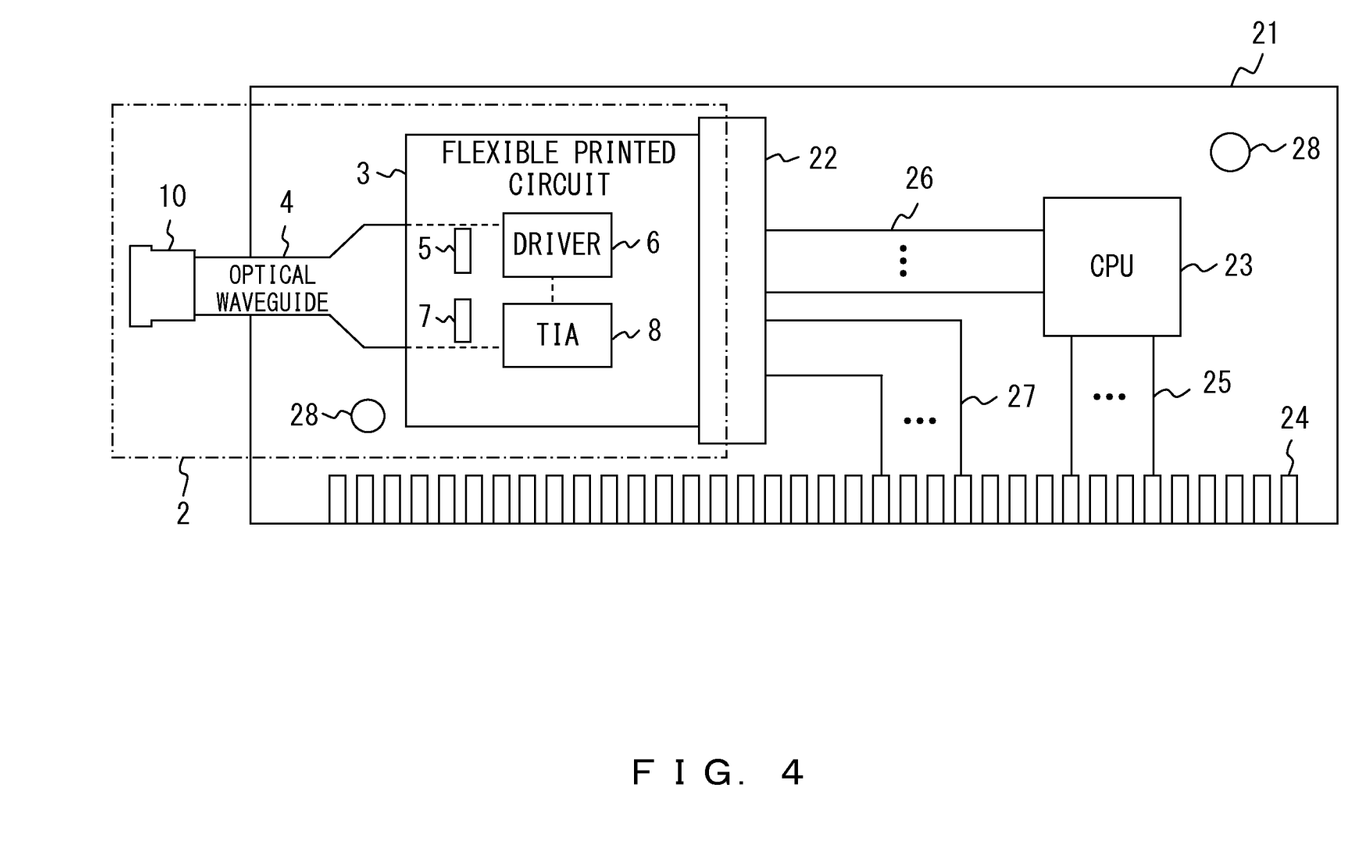
FIG. 4 illustrates a configuration of an optical module circuit board to which an optical transceiver module is attached.

FIG. 4 illustrates a configuration of an optical module circuit board to which the optical transceiver module 2 is attached. On a surface of the optical module circuit board 21, a connector socket 22 and a CPU 23 are mounted. In addition, in an edge region of one side of the optical module circuit board 21, an edge connector 24 is formed.

The optical module circuit board 21 has a circuit on the surface. The optical module circuit board 21 may be a multi-layer board. In this case, the optical module circuit board 21 may also have a circuit on an inner layer. The circuit formed in the optical module circuit board 21 may be realized by a printed conductor. For example, this circuit includes a control signal line 25 between the CPU 23 and the edge connector 24, a control signal line 26 between the CPU 23 and the connector socket 22, and a data signal line 27 between the connector socket 22 and the edge connector 24. Further, this circuit may include a circuit element other than a printed conductor which realizes a signal line. A material of the optical module circuit board 21 is, but is not particularly limited to, for example, resin, ceramic, or metal.

Terminals of the connector socket 22 are electrically connected to a circuit formed in the optical module circuit board 21. The connector socket 22 can accommodate the flexible printed circuit 3 of the optical transceiver module 2 as explained with reference to FIG. 2 and FIG. 3. At this time, terminals of the edge connector 9, which is formed in the flexible printed circuit 3, are electrically connected to corresponding terminals of the connector socket 22. Accordingly, the optical transceiver module 2 is electrically connected to a circuit formed in the optical module circuit board 21 via the connector socket 22.

The CPU 23 controls the driver IC 6 and the TIA 8 of the optical transceiver module 2. For example, the CPU 23 controls the driver IC 6 so that the E/O converter 5 operates with favorable characteristics. The characteristics of the E/O converter 5 may change in accordance with temperature. Further, the CPU 23 stops the driver IC 6 in order to suppress power consumption when no data signals are input from the blade main board 110. Similarly, the CPU 23 stops the TIA 8 when no optical signals are input via the optical waveguide 4. Further, when the CPU 23 detects an error in the optical transceiver module 2, the CPU 23 may inform the blade main board 110 of the error.

The edge connector 24 is formed so as to be electrically connected to corresponding terminals of the connector socket mounted on the blade main board 110. The shapes of the optical module circuit board 21 and the edge connector 24 are not particularly limited.

A through hole 28 is formed in the optical module circuit board 21. In the example illustrated in FIG. 4, two through holes 28 are formed. The through holes 28 are used to fix a heat sink to the optical module circuit board 21, which will be explained later. A method for fixing the heat sink to the optical module circuit board 21 is not particularly limited. Namely, the heat sink may be fixed to the optical module circuit board 21 without using the through holes 28. In this case, the through holes 28 do not need to be formed in the optical module circuit board 21.

Figure 5:
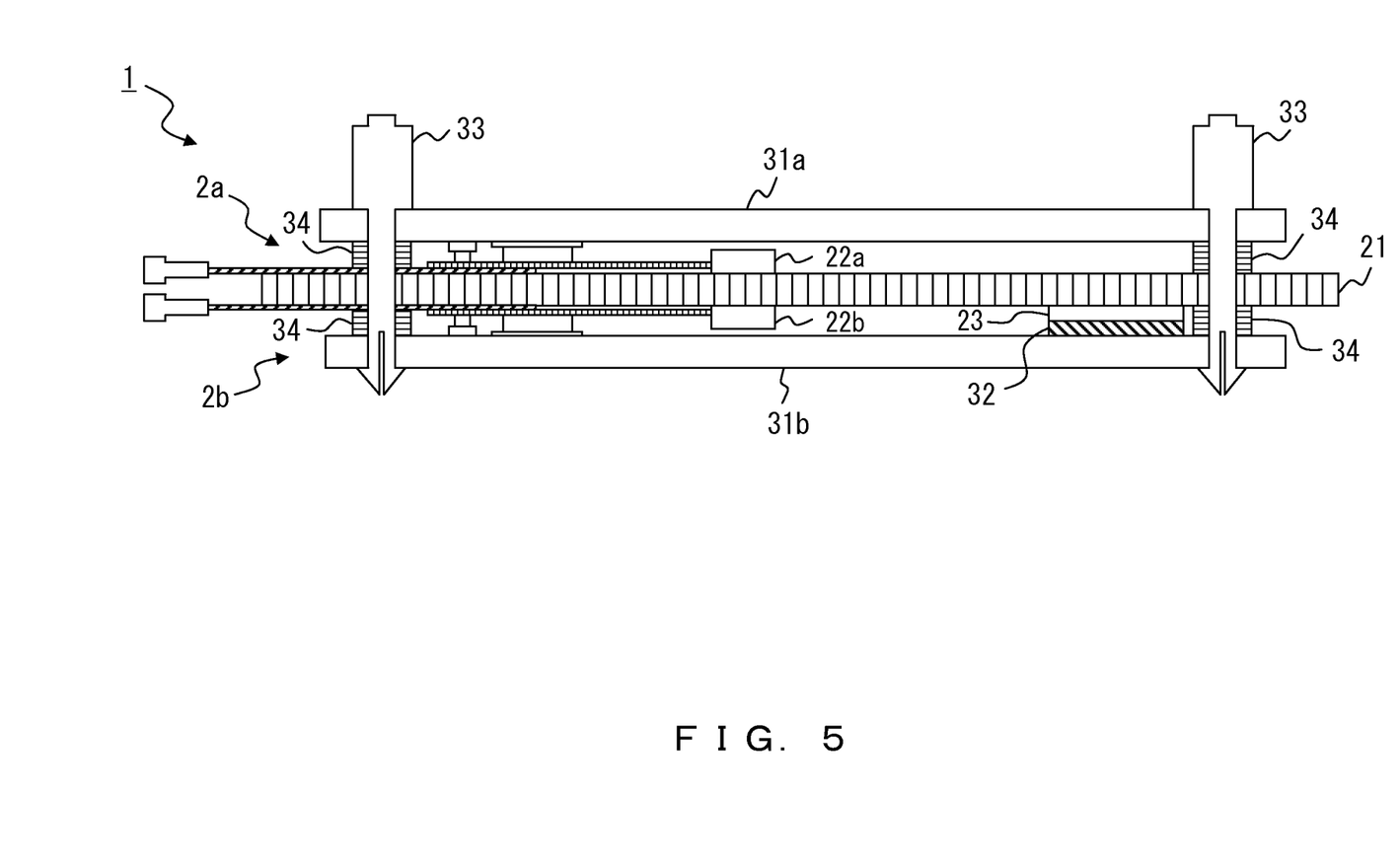
FIG. 5 illustrates a configuration of an optical module.
Figure 6:
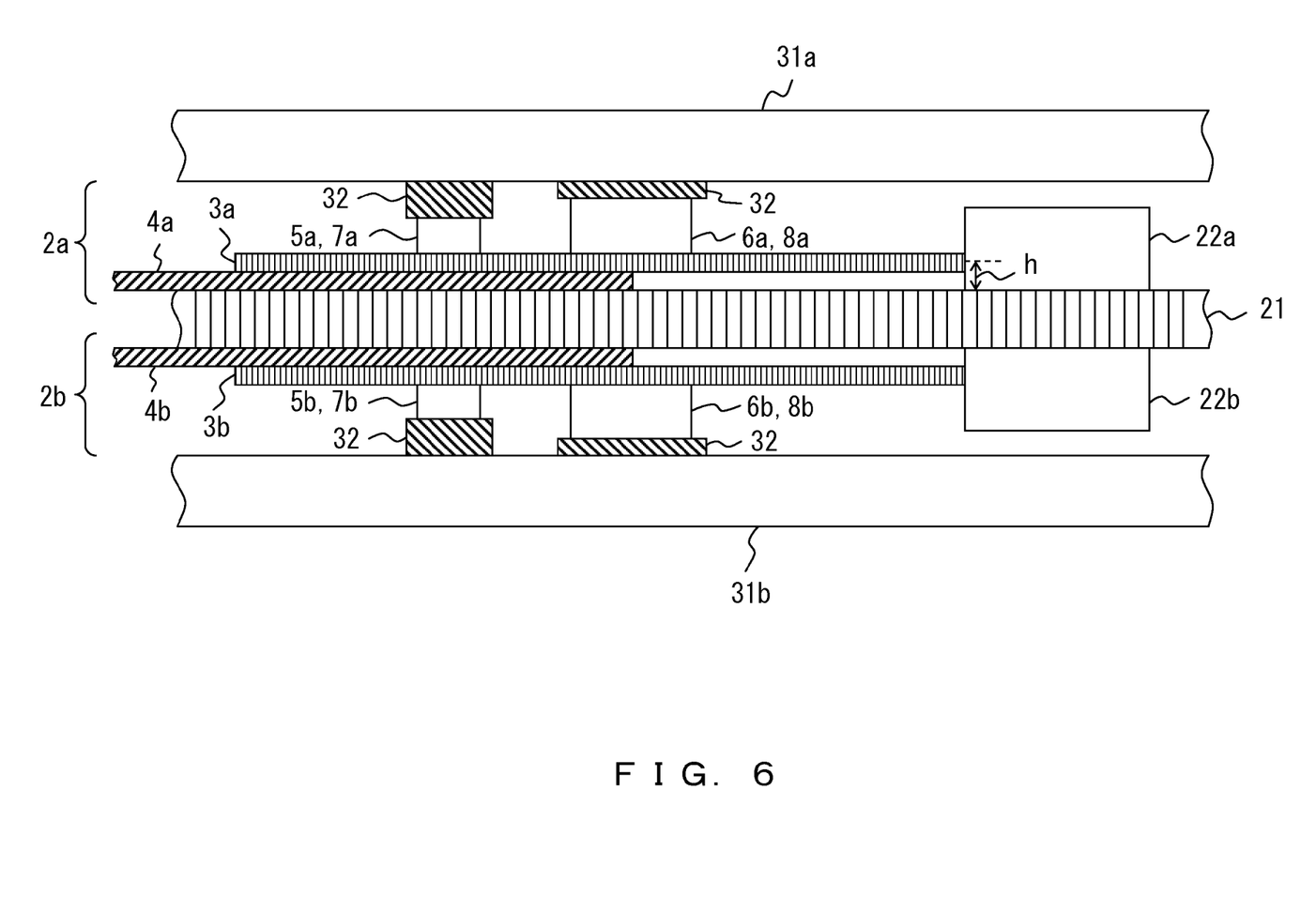
FIG. 6 is an enlarged view of a portion of the optical module illustrated in FIG. 5.

FIG. 5 illustrates a configuration of the optical module 1. FIG. 5 schematically illustrates a configuration seen from the side of the optical module 1. In FIG. 5, numerical references for some members are omitted for simplicity. For example, a numerical reference is omitted for each element of the optical transceiver modules 2a and 2b. FIG. 6 is an enlarged view of a portion of the optical module 1 illustrated in FIG. 5. FIG. 6 illustrates a structure in which an optical transceiver module is fixed to an optical module circuit board.

In the examples illustrated in FIG. 5 and FIG. 6, the optical transceiver module 2 is electrically connected to each surface of the optical module circuit board 21. Namely, the optical transceiver module 2a is provided on one surface of the optical module circuit board 21, and the optical transceiver module 2b is provided on the other surface of the optical module circuit board 21. In the following description, one surface of the optical module circuit board 21 on which the optical transceiver module 2a is provided may be referred to as an "upper surface," and the other surface of the optical module circuit board 21 on which the optical transceiver module 2b is provided may be referred to as a "lower surface."

Each of the optical transceiver modules 2a and 2b corresponds to the optical transceiver module 2 as explained with reference to FIG. 4. Accordingly, the optical transceiver module 2a includes a flexible printed circuit 3a, an optical waveguide 4a, an E/O converter 5a, a driver IC 6a, an O/E converter 7a, and a TIA 8a. Similarly, the optical transceiver module 2b includes a flexible printed circuit 3b, an optical waveguide 4b, an E/O converter 5b, a driver IC 6b, an O/E converter 7b, and a TIA 8b.

Connector sockets 22a and 22b are respectively mounted on the upper surface and the lower surface of the optical module circuit board 21. Each of the connector sockets 22a and 22b corresponds to the connector socket 22 as explained with reference to FIG. 4.

In this example, the CPU 23 is mounted on the lower surface of the optical module circuit board 21. In this configuration, the CPU 23 controls both of the optical transceiver modules 2a and 2b. Namely, the CPU 23 controls the driver ICs 6a and 6b and the TIAs 8a and 8b.

On the upper surface of the optical module circuit board 21, the optical transceiver module 2a is electrically connected to the optical module circuit board 21 via the connector socket 22a. The flexible printed circuit 3a and the optical waveguide 4a of the optical transceiver module 2a are disposed approximately or substantially in parallel to the optical module circuit board 21. In addition, an end of the flexible printed circuit 3a is inserted into the connector socket 22a so that terminals of the edge connector 9, which is formed on the flexible printed circuit 3a, are electrically connected to corresponding terminals of the connector socket 22a.

The height of the connector socket 22a is preferably small. In addition, an insertion slot of the connector socket 22a, into which the flexible printed circuit 3a is inserted, is preferably disposed at a position of 0.5 mm or less from the upper surface of the optical module circuit board 21. Namely, it is preferable that a connector socket in such a shape is used for the connector socket 22a. In the example illustrated in FIG. 6, the height h is 0.5 mm or less. Here, the total thickness of the flexible printed circuit 3a and the optical waveguide 4a is about 100 μm. When a lens is provided between the flexible printed circuit 3a and the optical waveguide 4a, the thickness of the lens is also about 100 μm. Further, the thickness of each of the adhesive layers is about 30 μm. Namely, when the optical transceiver module 2a is mounted on the upper surface of the optical module circuit board 21 as illustrated in FIG. 6, the flexible printed circuit 3a is disposed at a height position of 200-300 μm from the upper surface of the optical module circuit board 21. Accordingly, in a case in which the height h is 0.5 mm or less, when one end of the flexible printed circuit 3a is inserted into the connector socket 22a, and a partial region of the flexible printed circuit 3a is held to the optical module circuit board 21 by the optical waveguide 4a, the lens, and the adhesive (in some cases, only the optical waveguide 4a and the adhesive), the stress applied to the flexible printed circuit 3a is small.

Similarly, on the lower surface of the optical module circuit board 21, the optical transceiver module 2b is electrically connected to the optical module circuit board 21 via the connector socket 22b. At this time, the flexible printed circuit 3b and the optical waveguide 4b of the optical transceiver module 2b are disposed approximately or substantially in parallel to the optical module circuit board 21. In addition, an end of the flexible printed circuit 3b is inserted into the connector socket 22b so that terminals of the edge connector 9, which is formed in the flexible printed circuit 3b, are electrically connected to corresponding terminals of the connector socket 22b.

The shapes of the optical transceiver module 2b and the connector socket 22b are substantially the same as those of the optical transceiver module 2a and the connector socket 22a, respectively. Therefore, on the lower surface of the optical module circuit board 21, the stress applied to the flexible printed circuit 3b is small.

The heat sinks 31a and 31b are disposed to sandwich the optical module circuit board 21 on which the optical transceiver modules 2a and 2b are provided. A material of the heat sinks 31a and 31b is, but is not particularly limited to, for example, aluminum or aluminum alloy.

A heat dissipating sheet 32 is provided in respective spaces between the heat sink 31a and the E/O converter 5a, the driver IC 6a, the O/E converter 7a, and the TIA 8a. According to this configuration, heat generated in the E/O converter 5a, the driver IC 6a, the O/E converter 7a, and the TIA 8a is conducted to the heat sink 31a via the heat dissipating sheet 32. The heat dissipating sheet 32 is realized by a material with excellent thermal conductivity. In addition, the heat dissipating sheet 32 is realized by an elastic material or a gel-like deformable material. In the following descriptions, the heat dissipating sheet 32 is realized by a material that has excellent thermal conductivity and that is elastic.

Similarly, a heat dissipating sheet 32 is also provided in respective spaces between the heat sink 31b and the E/O converter 5b, the driver IC 6b, the O/E converter 7b, and the TIA 8b. According to this configuration, heat generated in the E/O converter 5b, the driver IC 6b, the O/E converter 7b, and the TIA 8b is conducted to the heat sink 31b via the heat dissipating sheet 32.

Further, the heat dissipating sheet 32 may also be provided between the heat sink 31b and the CPU 23. According to this configuration, heat generated in the CPU 23 is conducted to the heat sink 31b via the heat dissipating sheet 32.

A push pin 33 fixes the heat sinks 31a and 31b to the optical module circuit board 21. In this example, as illustrated in FIG. 5, a space between the heat sinks 31a and 31b and the optical module circuit board 21 is adjusted by spacers 34. In the example illustrated in FIG. 5, the spacers 34 provided on the sides of the upper surface and the lower surface of the optical module circuit board 21 have the same shape. Note that s method for fixing the heat sinks 31a and 31b to the optical module circuit board 21 is not limited to the method using the push pin, but may be a method using, for example, a screw.

As described above, the heat sinks 31a and 31b are disposed so as to sandwich the optical module circuit board 21 on which the optical transceiver modules 2a and 2b are mounted. At this time, on the side of the upper surface, the heat dissipating sheets 32 provided between the heat sink 31a and the E/O converter 5a, the driver IC 6a, the O/E converter 7a, and the TIA 8a are pressed onto the E/O converter 5a, the driver IC 6a, the O/E converter 7a, and the TIA 8a. Namely, these heat dissipating sheets are compressed. The distance between the heat sink 31a and the optical module circuit board 21 is adjusted (or secured) by the spacers 34. Therefore, the height of the spacer 34 is determined so as to appropriately compress the heat dissipating sheets 32 which are provided on the E/O converter 5a, the driver IC 6a, the O/E converter 7a, and the TIA 8a. Note that the height of the spacer 34 is greater than that of the connector socket 22a, and in this example, the heat sink 31a is not in contact with the connector socket 22a.

Accordingly, the E/O converter 5a, the driver IC 6a, the O/E converter 7a, and the TIA 8a are thermally coupled to the heat sink 31a. At this time, the optical transceiver module 2a (i.e., the flexible printed circuit 3a and the optical waveguide 4a) is pressed onto the optical module circuit board 21. In other words, the heat sink 31a fixes the optical transceiver module 2a to the optical module circuit board 21, in addition to being thermally coupled to the E/O converter 5a, the driver IC 6a, the O/E converter 7a, and the TIA 8a. In this structure, as described above, the insertion slot of the connector socket 22a is positioned near the upper surface of the optical module circuit board 21, and therefore, the stress applied to the flexible printed circuit 3a is small even when the optical transceiver module 2a is pressed onto the optical module circuit board 21.

Similarly, the heat dissipating sheets 32 which are provided between the heat sink 31b and the E/O converter 5b, the driver IC 6b, the O/E converter 7b, and the TIA 8b are pressed onto the E/O converter 5b, the driver IC 6b, the O/E converter 7b, and the TIA 8b. Namely, these heat dissipating sheets 32 are also compressed. Here, the distance between the heat sink 31b and the optical module circuit board 21 is also adjusted by the spacers 34. In addition, the height of the spacer 34 is greater than that of the connector socket 22b, and this the heat sink 31b is not in contact with the connector socket 22b.

Accordingly, the E/O converter 5b, the driver IC 6b, the O/E converter 7b, and the TIA 8b are thermally coupled to the heat sink 31b. At this time, the optical transceiver module 2b (i.e., the flexible printed circuit 3b and the optical waveguide 4b) is pressed onto the optical module circuit board 21. In other words, the heat sink 31b fixes the optical transceiver module 2b to the optical module circuit board 21, in addition to being thermally coupled to the E/O converter 5b, the driver IC 6b, the O/E converter 7b, and the TIA 8b. In addition, similarly to the flexible printed circuit 3a, the stress applied to the flexible printed circuit 3b is small, even when the optical transceiver module 2b is pressed onto the optical module circuit board 21.

As described above, in the optical module 1 according to the embodiment, the heat sink plays roles in fixing the optical transceiver module to the optical module circuit board, and dissipating heat from the E/O converter, the driver IC, the O/E converter, and the TIA. Accordingly, the configuration according to the embodiment enables reducing the size of an optical module, and efficiently dissipating heat generated in the E/O converter, the driver IC, the O/E converter, and the TIA.

In addition, in the optical module 1 according to the embodiment, the optical transceiver module 2 (2a and 2b) is removable from the optical module circuit board 21. Accordingly, an optical axis inspection, etc., can be individually performed for each of the optical transceiver modules 2 before the optical transceiver module 2 is attached to the optical module circuit board 21. Accordingly, yield rate degradation caused by a manufacturing variation can be suppressed. In the configuration described in the patent documents (Japanese Laid-open Patent Publication No. 2004-258065 and U.S. Pat. No. 6,661,939), a board of an optical module, an optical waveguide, and an optical device are integrated. For that reason, when an optical axis of the optical module is misaligned due to a manufacturing variation or other reasons, it is difficult to correct the misalignment. Accordingly, in an optical module including a plurality of E/O converters and O/E converters, yield rate is likely to be degraded if there is a manufacturing error such as optical axis misalignment.

For example, when a plurality of optical transceiver modules 2 are mounted on one board, the configuration according to the embodiment has advantages comparing with the configuration described in patent documents (Japanese Laid-open Patent Publication No. 2004-258065 and U.S. Pat. No. 6,661,939). Namely, in the configuration described in the patent documents, if one of a plurality of optical transceiver modules, which are mounted on a board, is defective, the entirety of the board needs to be replaced. On the other hand, the optical transceiver modules 2 according to the embodiment are removable from the optical module circuit board 21, and therefore, when one of the plurality of optical transceiver modules 2, which are mounted on the board, is defective, only the defective optical transceiver module 2 may be replaced. Accordingly, the configuration according to the embodiment enables improving yield rate as a whole.

Figure 7:
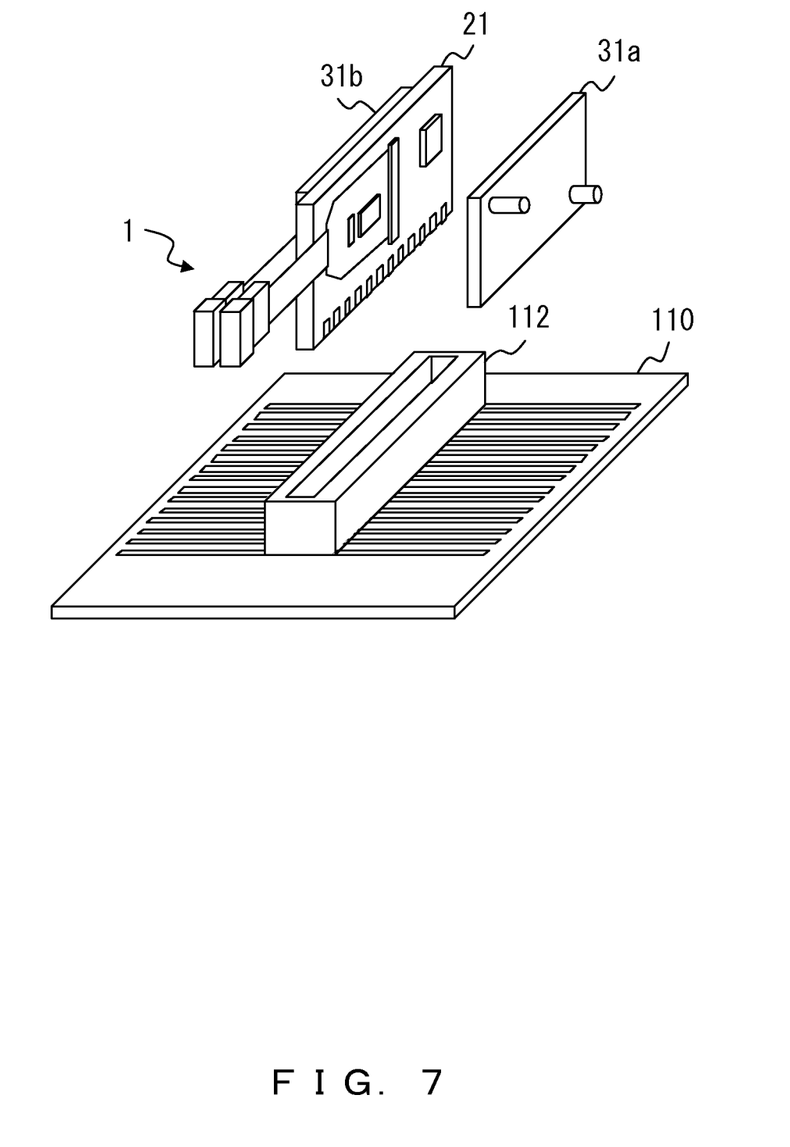
FIG. 7 illustrates an example in which an optical module is mounted on a board.

FIG. 7 illustrates an example in which the optical module 1 according to the embodiment is connected to a board. In the example illustrated in FIG. 7, the optical module 1 according to the embodiment is connected to the blade main board 110.

A vertical connection type edge connector socket 112 is mounted on the blade main board 110. As explained with reference to FIGS. 5-6, the optical module 1 includes the optical module circuit board 21, the optical transceiver modules 2a and 2b, and the heat sinks 31a and 31b. The optical module circuit board 21 is sandwiched by the heat sinks 31a and 31b. On both surfaces of the optical module circuit board 21, the optical transceiver modules 2a and 2b are respectively provided. Here, the optical transceiver modules 2a and 2b are pressed onto the optical module circuit board 21 by the heat sinks 31a and 31b. In addition, heat generated in the optical transceiver modules 2a and 2b is conducted to the heat sinks 31a and 31b and is dissipated.

An end of the optical module circuit board 21 is inserted into the vertical connection type edge connector socket 112 so that the terminals of the edge connector formed in the optical module circuit board 21 are electrically connected to corresponding terminals of the vertical connection type edge connector socket 112. As a result, the optical module 1 is connected to the blade main board 110 so as to project in the direction vertical to the blade main board 110.

Figure 8:
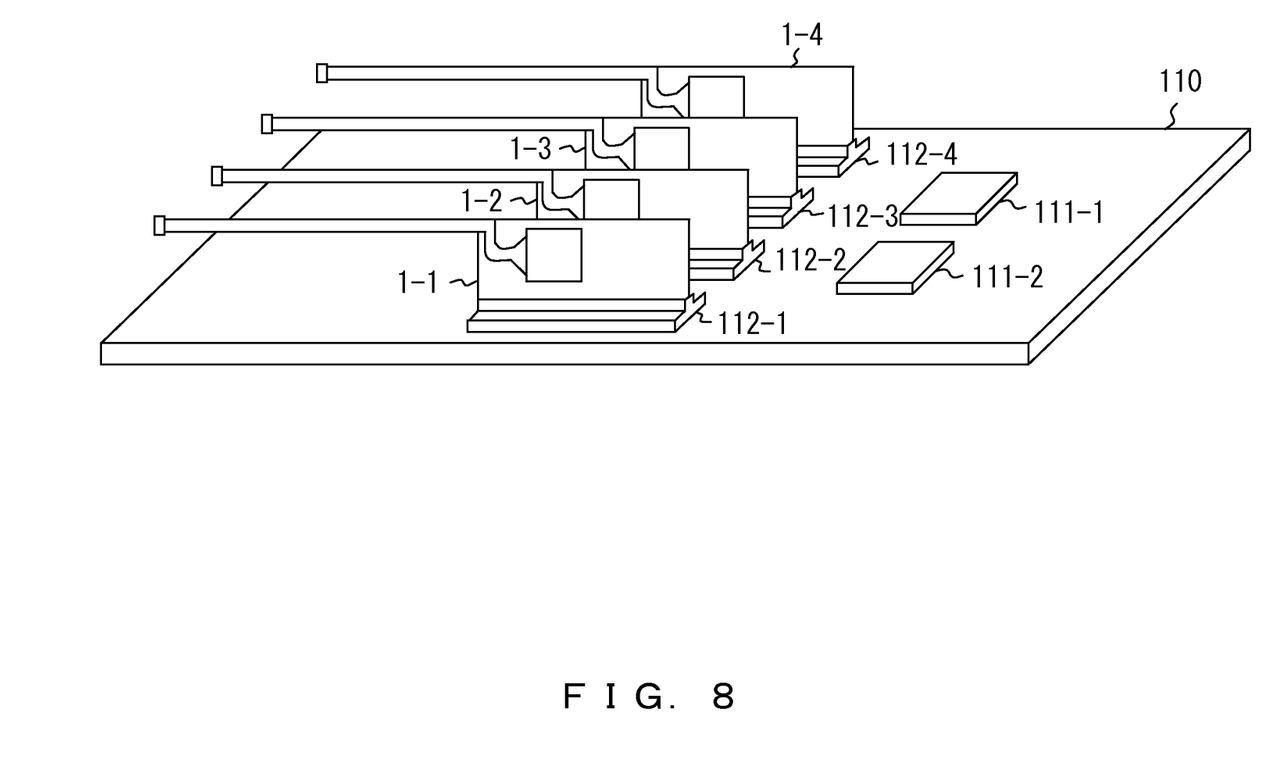
FIG. 8 illustrates another example in which an optical module is mounted on a board.

FIG. 8 illustrates another example in which the optical module 1 according to the embodiment is connected to a board. In the example illustrated in FIG. 8, a plurality of optical modules 1 are connected to the blade main board 110.

In the example illustrated in FIG. 8, CPUs 111-1 and 111-2 and vertical connection type edge connector sockets 112-1 to 112-4 are mounted on the blade main board 110. Optical modules 1-1 to 1-4 are electrically connected to a circuit formed in the blade main board 110 via the corresponding vertical connection type edge connector sockets 112-1 to 112-4. Each of the optical modules 1-1 to 1-4 corresponds to the optical module 1 according to the embodiment illustrated in FIG. 5 and FIG. 6. In FIG. 8, heat sinks of each of the optical modules 1-1 to 1-4 are not illustrated, for simplicity.

In the above configuration, the CPUs 111-1 and 111-2 can transmit data to other blades via the optical modules 1-1 to 1-4. In addition, the CPUs 111-1 and 111-2 can receive data from other blades via the optical modules 1-1 to 1-4.

As described above, in the example illustrated in FIG. 8, the plurality of optical modules 1-1 to 1-4 are connected to the blade main board 110 so as to project in the direction vertical to the surface of the blade main board 110. Accordingly, an area occupied by the optical modules on the surface of the blade main board 110 is reduced. In other words, dense implementation of optical transmitters and optical receivers is realized.

In the example described above, the E/O converter 5, the driver IC 6, the O/E converter 7, and the TIA 8 are mounted on the flexible printed circuit 3, but the present invention is not limited to this configuration. Namely, the E/O converter 5, the driver IC 6, the O/E converter 7, and the TIA 8 may be mounted on an inflexible circuit board. However, this circuit board is preferably formed thinly in order to reduce optical loss between the E/O converter 5 and the core 4a of the optical waveguide 4, and between the core 4a of the optical waveguide 4 and the O/E converter 7. Accordingly, as a circuit board on which the E/O converter 5, the driver IC 6, the O/E converter 7, and the TIA 8 are mounted, the flexible printed circuit 3 is a preferred example.

In addition, in the example described above, the heat sink is thermally coupled to the E/O converter 5, the driver IC 6, the O/E converter 7, and the TIA 8, but the present invention is not limited to this configuration. Namely, the heat sink may be configured to be thermally coupled to some elements or chips among the E/O converter 5, the driver IC 6, the O/E converter 7, and the TIA 8. In other words, the heat sink is thermally coupled to at least one of the E/O converter 5, the driver IC 6, the O/E converter 7, and the TIA 8.

In the example described above, one optical transceiver engine is provided on one surface of the optical module circuit board 21, but the present invention is not limited to this configuration. Here, the optical engine indicates an optical/electrical hybrid circuit including the E/O converter 5, the driver IC 6, the O/E converter 7, and the TIA 8.

Figure 9:
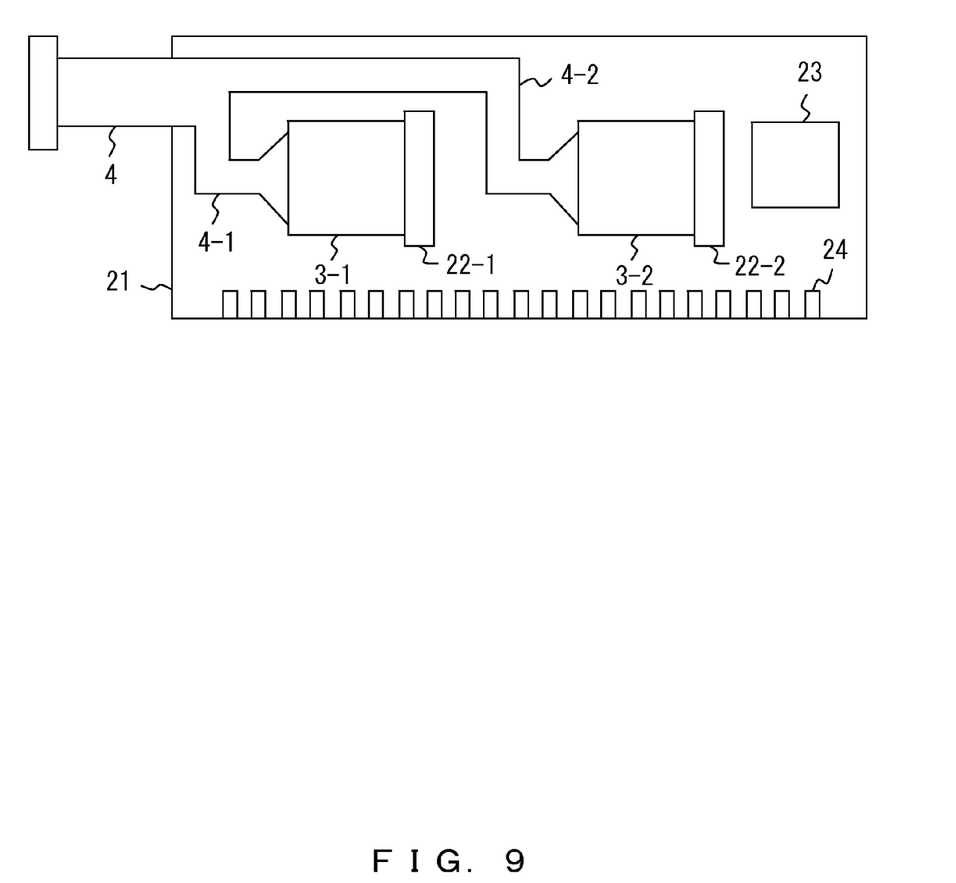
FIG. 9 illustrates another example of an optical transceiver module.

For example, in the example illustrated in FIG. 9, two optical transceiver engines are provided on one surface of the optical module circuit board 21. In this case, the optical transceiver module includes flexible printed circuits 3-1 and 3-2 and the optical waveguide 4. An optical engine (i.e., the E/O converter 5, the driver IC 6, the O/E converter 7, and the TIA 8) is mounted on each of the flexible printed circuits 3-1 and 3-2. The optical waveguide 4 includes an optical waveguide 4-1 that is optically coupled to the flexible printed circuit 3-1 and an optical waveguide 4-2 that is optically coupled to the flexible printed circuit 3-2. The flexible printed circuits 3-1 and 3-2 are respectively coupled to connector sockets 22-1 and 22-2 that are mounted on the optical module circuit board 21.

As described above, in the optical module according to the embodiment, the optical transceiver module including the optical engines is electrically connected to the optical module circuit board 21 using the connector sockets that are mounted on the optical module circuit board 21. Accordingly, it is possible to easily mount a plurality of optical transceiver modules on one optical module circuit board 21.

Note that, as an example, the optical module 1 is used for transmitting and receiving data between blades in the blade server 100, but the present invention is not limited to this. Namely, the optical module 1 according to the embodiment can be used for transmitting and receiving an optical signal between desired apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical module comprising:
   a first circuit board on which a connector socket is mounted;
   an optical transceiver module that is electrically connected to the first circuit board via the connector socket;
   a heat sink; and
   a heat dissipating sheet, wherein
   the optical transceiver module comprises:
      a second circuit board on which an electrical-to-optical converter, a drive circuit that drives the electrical-to-optical converter, an optical-to-electrical converter, and a current-to-voltage conversion circuit that converts an output current of the optical-to-electrical converter into a voltage signal are face-down mounted; and
      an optical waveguide that guides an optical signal generated by the electrical-to-optical converter to an output end of the optical transceiver module, and that guides an optical signal input to the optical transceiver module to the optical-to-electrical converter, and wherein the heat sink is thermally coupled to the electrical-to-optical converter, the drive circuit, the optical-to-electrical converter, or the current-to-voltage conversion circuit, or any combination thereof via the heat dissipating sheet, and the heat sink presses the optical transceiver module onto the first circuit board.

2. The optical module according to claim 1, wherein one end of the second circuit board is held by a connector socket mounted on the first circuit board, and a portion of the second circuit board is held to the first circuit board by the optical waveguide and an adhesive.

3. The optical module according to claim 1, wherein one end of the second circuit board is held by a connector socket mounted on the first circuit board, and a portion of the second circuit board is held to the first circuit board by the optical waveguide, a lens that optically couples the waveguide with the electrical-to-optical converter and the optical-to-electrical converter, and an adhesive.

4. The optical module according to claim 1, wherein the optical transceiver module is electrically connected to each surface of the first circuit board.

5. The optical module according to claim 4, wherein the heat sink includes a first heat sink and a second heat sink, and the first circuit board is sandwiched by the first and second heat sinks so that the optical transceiver module is pressed onto each surface of the first circuit board.

6. The optical module according to claim 1, wherein a control circuit that controls the drive circuit and the current-to-voltage conversion circuit is mounted on the first circuit board.

7. The optical module according to claim 1, wherein the electrical-to-optical converter, the drive circuit, the optical-to-electrical converter, and the current-to-voltage conversion circuit are face-down mounted on one surface of the second circuit board, and the optical waveguide is stuck to the other surface of the second circuit board.

8. The optical module according to claim 1, wherein the first circuit board has an edge connector corresponding to a vertical connection type edge connector socket.

9. The optical module according to claim 1, wherein the second circuit board is a flexible printed circuit.

10. A blade server that includes a plurality of blades, wherein each of the plurality of blades has the optical module according to claim 1, and an optical signal is transmitted between the optical modules.

* * * * *